United States Patent [19]

Kuechli et al.

[11] 4,087,894
[45] May 9, 1978

[54] METHOD OF MANUFACTURE OF WATCH CASE

[75] Inventors: Gottfried Kuechli, Bienne; Paul Volgyi, La Neuveville, both of Switzerland

[73] Assignee: Societe Suisse pour l'Industrie Horlogere Management Services, S.A., Bienne, Switzerland

[21] Appl. No.: 745,708

[22] Filed: Nov. 29, 1976

[30] Foreign Application Priority Data

Dec. 4, 1975 United Kingdom ............... 49841/75

[51] Int. Cl.$^2$ ............................................. B23P 13/00
[52] U.S. Cl. ..................................... 29/179; 29/420.5; 29/DIG. 25; 29/DIG. 26; 29/DIG. 31; 58/88 R; 75/203; 106/43; 106/73.33

[58] Field of Search ............. 29/179, 558, 420, 420.5, 29/DIG. 19, DIG. 25, DIG. 26, DIG. 31, 182.8; 58/88 R; 106/43, 65, 73.33; 252/516, 520; 75/203, 206

[56] References Cited

U.S. PATENT DOCUMENTS

| 3,242,664 | 3/1966 | Lederrey | 29/179 X |
| 3,669,695 | 6/1972 | Iler et al. | 58/88 R X |
| 3,679,442 | 7/1972 | Bergna | 106/43 |
| 3,719,479 | 3/1973 | Flanagan | 29/179 X |
| 3,776,706 | 12/1973 | Daniels et al. | 106/43 X |
| 3,998,671 | 12/1976 | Irion | 75/203 X |

*Primary Examiner*—Victor A. DiPalma
*Attorney, Agent, or Firm*—Griffin, Branigan and Butler

[57] ABSTRACT

A watch case is made from an electrically conductive hard material compounded from aluminum oxide and titanium carbide by forming a blank by sintering the material, subjecting the blank to a heat treatment, spark machining the blank to its final form, and fine grinding and polishing the blank to a desired finish.

4 Claims, No Drawings

METHOD OF MANUFACTURE OF WATCH CASE

During the past several years numerous propositions have been advanced for the manufacture of watch-cases and similar articles out of what might be termed exotic materials. Thus, in contrast to the use of such well-known materials as gold, silver, stainless steel and like metals various propositions have been advanced which would employ hard metals such as tungsten carbide or ceramics such as sintered aluminium oxide. Reference may be had for example to GB patent specification No. 950,127 which provides certain details in respect of the manufacture of a watch-case from sintered tungsten carbide. Although this specification makes mention of titanium carbide, there are no particular details given in respect of this latter material, and it may be concluded that as a practical matter titanium carbide was not yet ripe to be thus employed.

In GB specification No. 1,240,239 there is described a watch-case made from alumina ceramic which has been sintered. Essentially, the same information is given in GB specification No. 1,339,624.

Although in theory certain definite advantages may be drawn from use of such materials there are concomitant disadvantages to be considered. Thus, for example, a watch-case made from tungsten carbide would tend to be extremely heavy and thus constitute an encumbrance on the wrist of the user. In the case of titanium carbide, although this latter material would be much lighter, it would appear that as of the time that the specification concerning this material was prepared no full study had been made of the preparation of titanium carbide such as would adapt it to watch-cases. In the case of sintered alumina watch-cases such would be clearly of light weight and thus would not suffer from the same disadvantages as the hard metal cases. Nevertheless, they have a certain disadvantage inasmuch as unless most carefully prepared and finished such watch-cases would tend to resemble plastic materials and thus might be considered by the average purchaser as something for a cheaper line of watches. In reality of course, the difficulty of working such material would place it in the category of a material suitable only for the most expensive watches.

Further to the foregoing disadvantages there might be mentioned the difficulty of providing the aforenamed hard materials and similar materials thereto with the variety of shapes and forms which are desirable in keeping up with fashion. Thus where it is desired to sinter tungsten carbide or titanium carbide such sintered process is limited in practice to certain shapes and forms and thus will not necessarily be in full conformity with the fashion of the moment. The same is true in respect of sintered alumina watch-cases where the difficulty of machining subsequently can only add to the expense.

The present invention proposes to provide a watch-case which whilst overcoming certain difficulties associated with the prior proposals has an aesthetic quality particularly its own and at the same time enables production of a wide variety of forms.

One feature of the present invention is its use of an electrically conductive ceramic material. This provides an initial advantage inasmuch as very highly specialized forms may be obtained through the use of spark machining methods. By proper choice of materials it is furthermore possible to obtain a watch-case or like piece of jewellery which is harder even than those formerly proposed to be made of the carbide metals or from sintered aluminium oxide. Finally, a judicious choice of material will give a most striking aesthetic effect inasmuch as there will result a watch-case which although basically of ceramic composition, nevertheless presents a distinct metallic appearance.

One material which has been found suitable for the watch-cases of the present invention is manufactured by Feldmuhle Aktiengesellschaft of Dusseldorf, Western Germany, and is designated as Feldmuhle SHT. Such material is a basic compound of aluminium oxide and titanium carbide sintered together and is obtainable in the form of blanks already sintered. This material is harder than sintered alumina and must be formed by sintering under pressure. In view of the fact that it contains a substantial percentage of titanium carbide it is electrically conductive and thereby lends itself to spark machining processes for giving particular forms to the blank as furnished by the manufacturer.

Accordingly, the invention comprises a process for the manufacture of a watch case of an electrically conductive material whose hardness is at least equal to that of sintered alumina wherein a blank is initially formed by sintering the material under pressure and isostatic compacting at high temperature and gas pressure or by pyrolysis, the blank thus obtained being given its final form by spark machining and thereafter fine ground and polished to a desired surface finish. The invention, of course, is equally intended to encompass watch cases when made by the process as hereinbefore indicated.

The process of removing material by means of electric sparks is not in itself new, however, it has been found desirable in order to proceed with reasonable speed to add certain particularities in order that the process hereinafter described may become economic. It is furthermore to be noted that unless the steps as hereinafter delineated are followed rather carefully there is a substantial risk of breakage which of course adds to the expense of producing watch cases by such methods.

The sintered blanks of compound are thus initially received from the producer and in providing instructions to the original manufacture of such blanks these should, of course, be sintered to dimensions approximately equal to, but somewhat greater than the overall dimensions of the finished product. The blanks themselves may normally be expected to take the form of solid flattened cylinders and owing to the nature of the sintering process under very high pressure will be completely solid without holes therein.

It has been found in practice useful to proceed initially with a heat treatment prior to subjecting the blanks to the spark machining process. Such a heat treatment may be effected by heating the blanks during a period from 2 – 5 hours to a temperature which may range between 1100° – 1400° C under a vacuum which may range from $5 \times 10^{-4}$ to $5 \times 10^{-5}$ Torr. The maximum temperature is maintained during a period which may range from two to six hours and thereafter cooling under vacuum is permitted to a lower temperature of about 300°. Thereafter atmospheric pressure is restored and cooling proceeds until the ambient temperature is reached. Cooling at this stage may proceed at a rate of about 140° per hour. The entire heat treatment may thus take anywhere from 5 to 20 hours.

Next, the machining process may be considered. Applicants have found that for best results a suitable type of spark machining installation will provide means for controlling the duration of pulses applied to the working tool and as well the duration of time between the pulses. Thus the spark machining installation will be provided with suitable programming arrangements. One satisfactory machine is available from the manufacturer Charmilles of Geneva, Switzerland, and the control arrangements provided with the Charmilles apparatus enable a precise control to be exercised over the pulse duration and as well the interval between pulses. However, it should be emphasized that other installations may turn out in practice to be equally satisfactory. One additional feature, however, of the Charmilles installation is that of a monitoring device which, in the event that difficulties should arise in the form of gap contamination or short-circuits provoked for instance by the detached material the working electrode will be immediately moved away thereby to prevent damage to the workpiece undergoing machining.

In proceeding to impart a given shape to the workpiece undergoing treatment it is of course necessary to provide initially tools which have the desired form. The programming of the spark machining installation will be thereafter determined by the depth and of the form of the electrode. Thus, there will be in effect two time bases, the machining rhythm being composed of a first time base during which a current pulse of constant energy will be applied to the electrode and a second time base which comprises the interval between current pulses. These intervals will be chosen in accordance with the depth of machining to be carried out and of the geometry of the electrode and may vary considerably from one piece to another having different form. It will be readily realized that the reason for this proceeding is to permit the installation to eliminate the material removed during the application of a current pulse and that in accordance with the depth of the cut in any given situation this may take more or less time. Through use of the monitoring installation as provided with the Charmilles machine difficulties which may arise through gap contamination, short-circuiting or actual electrode contact with the workpiece may be substantially eliminated inasmuch as the monitoring device upon sensing a disturbance of this nature will immediately remove the working tool from the vicinity of the work-piece. This has the desirable result of substantially preventing damages which might occur to the work piece. Since such work pieces are quite expensive it is considered to be a desirable feature of this machine.

Although, up to the present, only a single material has been considered for production of watch-cases or like jewellery in accordance with this invention, it is considered that any similar material having the characteristics of electric conductibility could likewise be utilized and such materials could be chosen in accordance with the aesthetic effect likely to result from their use. Again should it be desired to utilize other mixed ceramic metallic sintered materials such should be well within the possibilities offered by this particular procedure. Thus, should it be desired, for instance, to make use of a mixed ceramic material in which the metallic component was tungsten carbide this would appear to cause no particular difficulties it being merely noted that the heat treatment, although different in detail, would follow the same general principle and the various factors affecting the programming of the spark machining installation would have to be varied to take into account the different nature of this particular material. Other mixtures of carbides nitrides, borides, silizides, metals and metallic oxides particularly aluminium oxide should likewise be taken into account as offering good possibilities under the present procedures.

As soon as the machining step has been completed it will be realized that owing to the very nature of this type of machining the completed product at this stage is very close to the final size desired and that furthermore all angles, voids, and like specific forms will be already incorporated into the piece which has been brought to this point. Obviously, for watch-cases and jewellery it will probably be desirable to provide finishing steps and these are, of course, fine grinding and polishing. Herein it is generally necessary to make use of diamond polishing in view of the hardness of the material. It has been found in practice that the particular material mentioned hereinabove and supplied by Feldmuhle AG is susceptible to receiving a high polish and upon being so polished reveals itself as a dark metallic grey material. It can be expected that other materials as enumerated hereinabove would provide other aesthetic effects. Owing to the manner in which the material is initially prepared and sintered under pressure or isostatic compacting the finished product is particularly dense and hard although where the compound is that of aluminium oxide and titanium carbide the specific gravity is not particularly high and in fact will not exceed that of titanium carbide alone. Thus the procedure as hereinbefore revealed enables production of high quality watch-cases or similar jewellery which have the advantage of hardness, lightness and a particular aesthetic quality which may be adapted to meet any change in style and thereby is highly advantageous for the market place.

What we claim is:

1. A process for the manufacture of a watch case from an electrically conductive hard material compounded from aluminum oxide and titanium carbide comprising the steps of:

initially forming a blank by sintering the material under pressure and isostatic compacting at high temperature and gas pressure;

subjecting the blank to a heat treatment including the steps of heating the blank under a vacuum ranging from $5 \times 10^{-4}$ to $5 \times 10^{-5}$ Torr during a period of 2 to 5 hours to a temperature ranging between 1100° C and 1400° C, maintaining the maximum temperature for a period of 2 to 6 hours, cooling under vacuum to a temperature of about 300° C, restoring ambient pressure and cooling at a rate of about 140° C/hour until ambient temperature is reached;

spark machining the blank to its final form; and, fine grinding and polishing the blank to a desired finish.

2. Process as set forth in claim 1 wherein the blank is initially formed to dimensions approximately equal to but somewhat greater than the overall dimensions of the finished product.

3. Process as set forth in claim 1 wherein the spark machining procedure includes a double time base composed of a first time base during which a current pulse of constant energy is applied to a machining electrode and a second time base comprising the interval between current pulses.

4. Process as set forth in claim 3 wherein the time bases are determined by the form of the machining electrode and the depth of the cut to be made.

* * * * *